United States Patent [19]

Nishimura

[11] Patent Number: 5,031,745
[45] Date of Patent: Jul. 16, 1991

[54] ELECTROMAGNETICALLY CONTROLLED SPRING CLUTCH MECHANISM

[75] Inventor: Kozo Nishimura, Akashi, Japan

[73] Assignee: Mita Industrial Co., Ltd., Japan

[21] Appl. No.: 592,246

[22] Filed: Oct. 2, 1990

[30] Foreign Application Priority Data

Oct. 11, 1989 [JP] Japan .................. 64-262934

[51] Int. Cl.⁵ ............................. F16D 27/10
[52] U.S. Cl. ..................... 192/84 T; 192/81 C
[58] Field of Search .......... 192/81 C, 41 S, 84 C, 192/84 B, 84 T, 12 BA

[56] References Cited

U.S. PATENT DOCUMENTS

| | | | |
|---|---|---|---|
| 2,523,772 | 9/1950 | McGibbon et al. | 192/81 C |
| 3,934,690 | 1/1976 | Janning | 192/84 T |
| 4,321,992 | 3/1982 | Gallo | 192/81 C |
| 4,502,578 | 3/1985 | Koyama | 192/81 C X |
| 4,570,768 | 2/1986 | Nishimura | 192/81 C X |
| 4,793,453 | 12/1988 | Nishimura | 192/81 C X |
| 4,825,988 | 5/1989 | Nishimura | 192/81 C X |
| 4,848,545 | 7/1989 | Nishimura | 192/81 C X |
| 4,913,274 | 4/1990 | Nishimura | 192/84 T |

FOREIGN PATENT DOCUMENTS

| | | | |
|---|---|---|---|
| 202030 | 11/1986 | European Pat. Off. | 192/84 T |
| 175633 | 10/1984 | Japan | 192/84 T |
| 236930 | 10/1986 | Japan . | |

*Primary Examiner*—Allan D. Herrmann
*Assistant Examiner*—Andrea Pitts
*Attorney, Agent, or Firm*—Beveridge, DeGrandi & Weilacher

[57] ABSTRACT

An electromagnetically controlled spring clutch mechanism including a rotating output member, a rotating input member, an armature assembly, an electromagnetic coil assembly and a coil spring. The coil spring is fitted astride both the output boss of the rotating output member and the input boss of the rotating input member. One end of the coil spring is anchored at the rotating input member, and the other is anchored to the armature assembly. The rotor of the rotating output member, the armature assembly, and the electromagnetic coil assembly are arranged in this sequence in the axial direction. The electromagnetic coil of the electromagnetic coil assembly is positioned radially outwardly of the coil spring. The electromagnetic coil assembly includes a casing, and this casing covers the rotor of the rotating output member, the armature assembly, the electromagnetic coil of the electromagnetic coil assembly and the coil spring.

9 Claims, 4 Drawing Sheets

FIG. 2

ELECTROMAGNETICALLY CONTROLLED SPRING CLUTCH MECHANISM

FIELD OF THE INVENTION

This invention relates to an electromagnetically controlled spring clutch mechanism of the type which when an electromagnetic coil is energized, a rotating input member and a rotating output member are coupled, and when the electromagnetic coil is deenergized, the coupling of the rotating input member and the rotating output member is cancelled.

DESCRIPTION OF THE PRIOR ART

Japanese Laid-Open Patent Publication No. 236930/1986 discloses an electromagnetically controlled spring clutch mechanism of the aforesaid type. This electromagnetically controlled spring clutch mechanism is provided with a rotating output member having an output boss and a rotor, a rotating input member having an input boss positioned adjacent to the output boss, an armature assembly including a supporting member and an armature linked to each other through a spring member, an electromagnetic coil assembly including an electromagnetic coil, and a coil spring fitted astride both the output boss and the input boss. One end of the coil spring is anchored at the input member, and the other end at the armature assembly. The electromagnetic coil, the rotor and the armature assembly are arranged successively in the axial direction in this order. The armature of the armature assembly faces opposite to the electromagnetic coil through the rotor. The armature is made of a magnetic material. When the electromagnetic coil is energized, the rotor fixed at a predetermined position is not attracted, but the armature is magnetically attracted to the electromagnetic coil. The spring member of the armature assembly is elastically deformed, and the armature is attracted to the rotor. In this state, the coil spring is contracted by the force exerted on the coil spring from the input boss of the input member being rotated. Thus, the input boss and the output boss are linked by the coil spring, and therefore the input member is linked to the output member. When the electromagnetic coil is deenergized, the spring member of the armature assembly elastically recovers, and the armature is isolated from the rotor. As a result, the contraction of the coil spring is cancelled, and the linking of the input boss and the output boss is cancelled. Hence, the linking of the input member to the output member is cancelled.

The conventional electromagnetically controlled spring clutch mechanism has the following problems to be solved.

Firstly, it is not fully compacted because the electromagnetic coil, the rotor and the armature are arranged successively in the axial direction in this sequence.

Secondly, the electromagnetic coil, the rotor, the armature assembly and the coil spring are exposed to view, and these members may collect dust and likely deteriorate in performance.

SUMMARY OF THE INVENTION

It is a first object of this invention to realize drastic compaction of an electromagnetically controlled spring clutch mechanism of the above type by changing the sequence of arrangement of the electromagnetic coil, the rotor and the armature assembly in the axial direction without involving a reduction in the required performance.

It is a second object of this invention to prevent an electromagnetically controlled spring clutch mechanism of the above type accurately from collecting dust at the electromagnetic coil, the rotor, the armature assembly and the coil spring and to surely avoid deterioration in performance which is owing to the adhesion of dust.

The first object is achieved by this invention by (1) arranging a rotor, an armature assembly and an electromagnetic coil assembly in this sequence in the axial direction and positioning the armature adjacent to the rotor and positioning the electromagnetic coil radially outwardly of the coil spring, (2) disposing a casing having a cylindrical wall of a magnetic material extending in proximity to the outside circumferential surface of the electromagnetic coil and the outside circumferential surface of the rotor, and a shielding wall made of a non-magnetic material and positioned between the electromagnetic coil and the armature assembly, (3) forming at least a portion of an output member including the rotor and at least a portion of an input member from a magnetic material, and (4) thus when the electromagnetic coil is energized, causing the armature to be magnetically attracted to the rotor by dint of a magnetic path passing through the casing, at least a portion of the output member including the rotor and at least a part of the input member.

To achieve the above second object, the casing of the electromagnetic coil assembly is formed into a shape including a cylindrical wall and two end walls existing at both ends of the cylindrical wall, and by this casing, the rotor, armature assembly, electromagnetic coil and coil spring are covered.

To achieve the first object, there is provided according to one aspect of the invention, an electromagnetically controlled spring clutch mechanism comprising a rotating output member having an output boss and a rotor, a rotating input member having an input boss adjacent to the output boss, an armature assembly including a supporting member and an armature linked to each other via a spring member, an electromagnetic coil assembly including an electromagnetic coil, and a coil spring fitted astride the output boss and the input boss, one end of the coil spring being anchored at the input member and its other end at the armature assembly, said spring clutch mechanism being of such a type that when the electromagnetic coil is energized, the armature is magnetically attracted, and the spring member is elastically deformed and the armature is attracted to the rotor, and by the contraction of the coil spring, the input boss and the output boss are drivingly coupled with each other, and when the electromagnetic coil is deenergized, the spring member is elastically recovered, and the armature is isolated from the rotor;

wherein the rotor, the armature assembly and the electromagnetic coil assembly are successively arranged in this sequence in the axial direction, the armature is positioned adjacent to the rotor, the electromagnetic coil is positioned radially outwardly of the coil spring, the electromagnetic coil assembly includes a casing as well as a shielding wall of non-magnetic material positioned between the electromagnetic coil and the armature assembly, the casing has a cylindrical wall of a magnetic material extending in proximity to the outside circumferential surface of the electromagnetic coil and to the outside circumferential surface of the rotor, at least a portion of the output member including the rotor and at least a portion of the input member are made of a magnetic material, and when the electromagnetic coil is energized, the presence of a magnetic path passing through the casing, at least a portion of the output member including the rotor, and at least a portion of the input member causes the armature to be magnetically attracted to the rotor.

To achieve the second object, there is provided according to another aspect of the invention an electromagnetically controlled spring clutch mechanism comprising a rotating output member having an output boss and a rotor, a rotating input member having an input boss adjacent to the output boss, an armature assembly including a supporting member and an armature linked to each other via a spring member, an electromagnetic coil assembly including an electromagnetic coil, and a coil spring fitted astride the output boss and the input boss, one end of the coil spring being anchored at the input member and its other end at the armature assembly, said spring clutch mechanism being of such a type that when the electromagnetic coil is energized, the armature is magnetically attracted, and the spring member is elastically deformed and the armature is attracted to the rotor, and by the contraction of the coil spring, the input boss and the output boss are drivingly coupled with each other, and when the electromagnetic coil is deenergized, the spring member is elastically recovered, and the armature is isolated from the rotor; wherein the electromagnetic coil assembly includes a casing having a cylindrical wall and both end walls existing at both ends of the cylindrical wall, and the rotor, the armature assembly, the electromagnetic coil and the coil spring are covered by the casing.

In the electromagnetic controlled spring clutch mechanism provided by one aspect of this invention, the rotor, the armature assembly and the electromagnetic coil are arranged in this sequence in the axial direction, and an electromagnetic coil can be accommodated by utilizing the space existing circumferentially of the coil spring fitted astride the input boss of the rotating input member and the output boss of the rotating output member. Hence, a drastic compaction can be realized. On the other hand, when the electromagnetic coil is energized, the armature is magnetically attracted to the rotor by the magnetic attracting force acting on the armature from the rotor positioned adjacent to the armoture. Accordingly, the attracting speed (sucking speed) of the armature with respect to magnetic attracting ability of the electromagnetic coil can be maintained at a sufficiently large one, and the response speed at the time of coupling is not decreased.

Furthermore, in the electromagnetically controlled spring clutch mechanism provided by the other aspect of this invention, the casing of the electromagnetic coil assembly covers not only the electromagnetic coil, but also the rotor, armature assembly and coil spring. Accordingly, these constituent elements are accurately prevented from gathering dust, and the deterioration of performance owing to dust collection can be avoided surely.

BRIEF DESCRIPTION OF THE DRAWINGS

FIG. 2 is a sectional view of the electromagnetically controlled spring clutch mechanism of FIG. 1;

DETAILED DESCRIPTION OF THE PREFERRED EMBODIMENTS

Now, the preferred embodiments of the electromagnetically controlled spring clutch mechanism of the invention will be described in detail with reference to the accompanying drawings.

Figure 1:
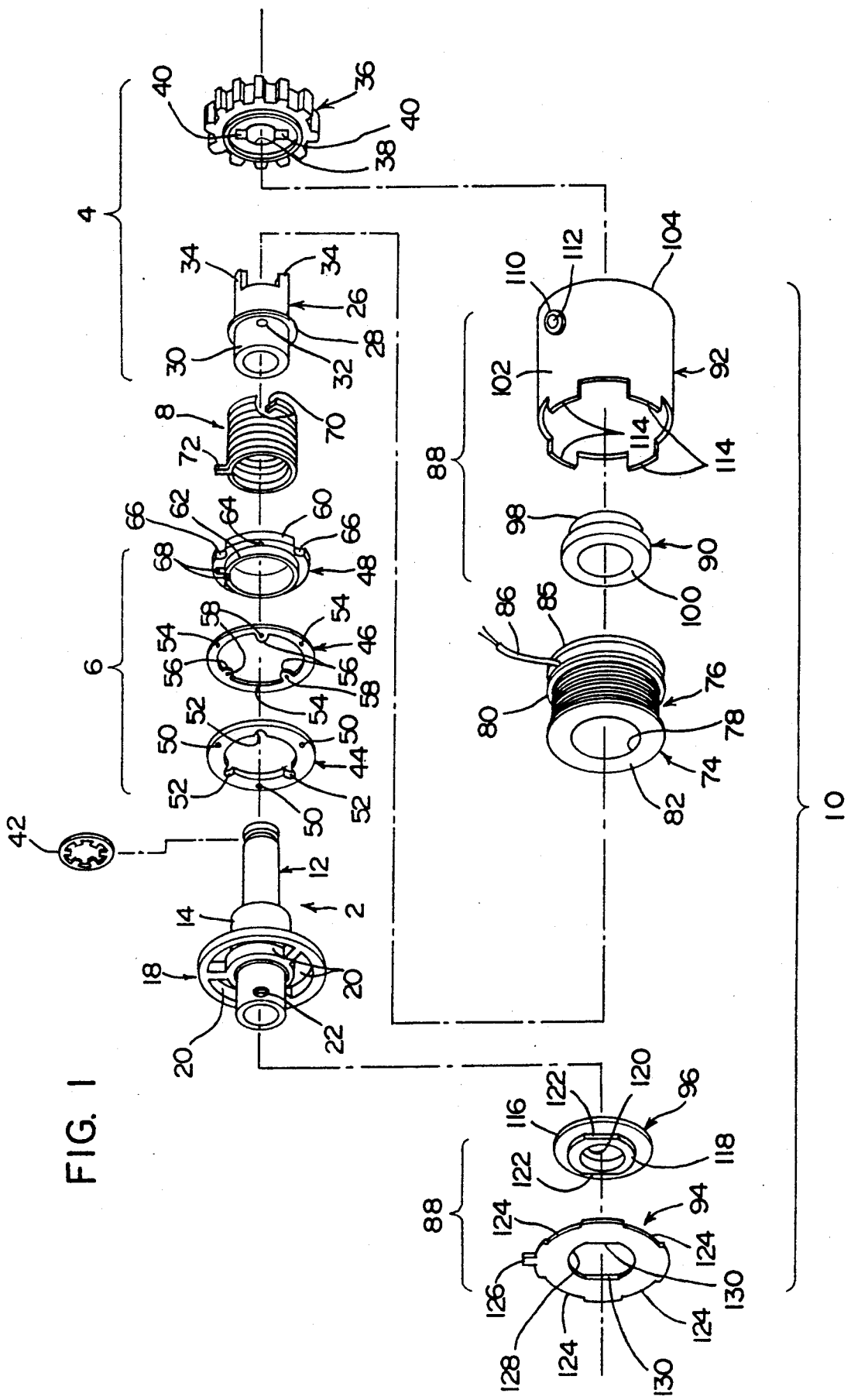
FIG. 1 is an exploded perspective view showing a preferred embodiment of the electromagnetically controlled spring clutch mechanism constructed in accordance with this invention.
Figure 2:
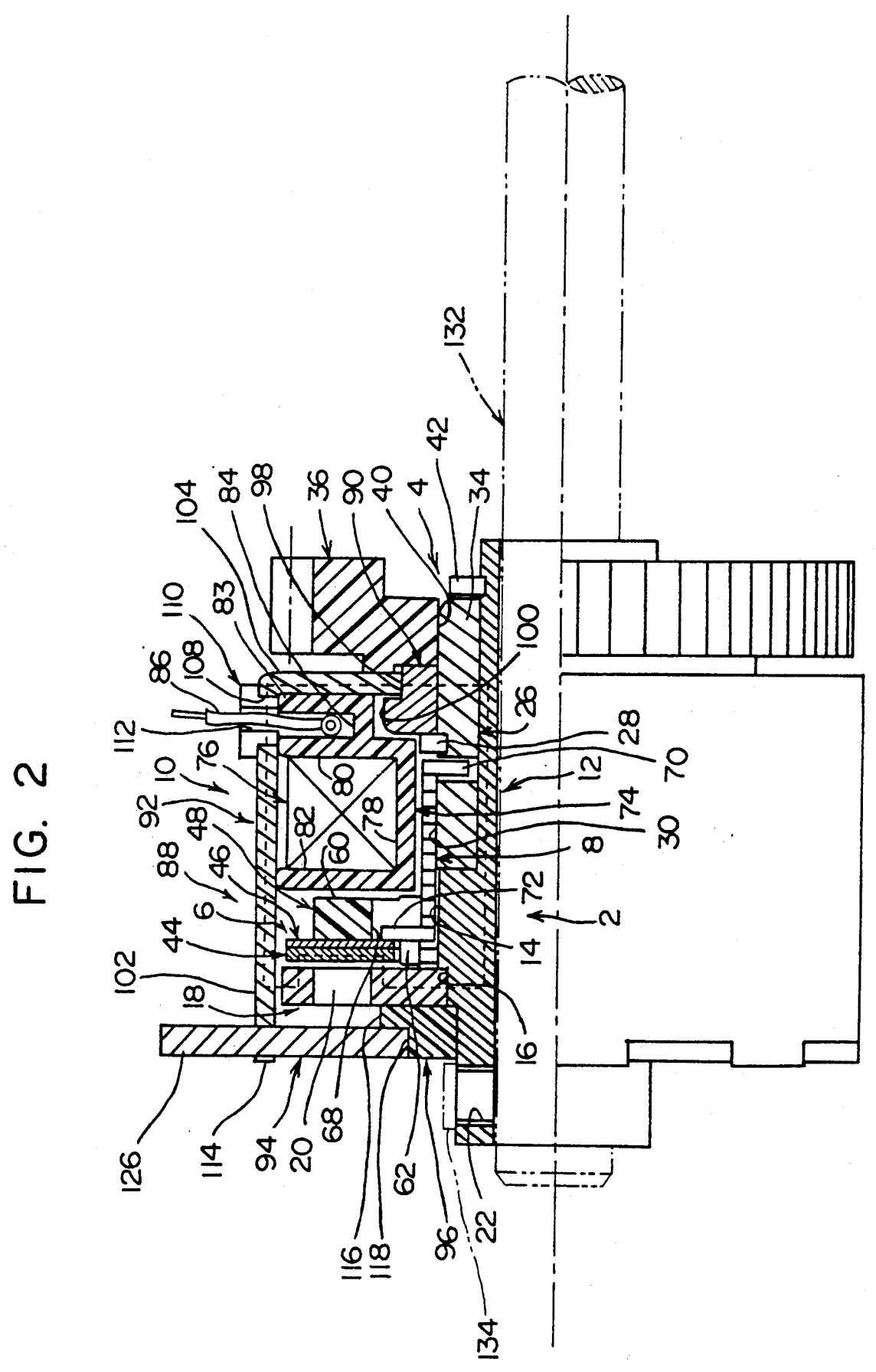

With reference to FIGS. 1 and 2, the illustrated electromagnetically controlled spring clutch mechanism is provided with a rotating output member 2, a rotating input member 4, an armature assembly 6, a coil spring member 8, and an electromagnetic coil assembly 10.

The rotating output member shown generally at 2 has a shaft portion 12 formed of a nearly slender, cylindrical member extending in the axial direction. The shaft portion 12 has formed nearly centrally in the axial direction an output boss 14 having a larger diameter than the other portions. Adjacent to the output boss 14, the shaft portion 12 has formed therein a mounting portion 16 having a slightly smaller diameter than the output boss 14. An annular member constituting the rotor 18 is fixed to the mounting portion 16 by a suitable method such as forcing with pressure. Three relatively large arcuate openings 20 are formed in the annular member constituting the rotor 18. A screw hole 22 extending radially is formed at one end portion (the left end portion in FIG. 2) of the annular member constituting the rotor 18. The nearly slender, cylindrical member constituting the shaft portion 12 is formed of a magnetic material such as free cutting carbon steel (SUM). The annular member constituting the rotor 18 is formed of a magnetic material such as cold-rolled steel (SPCC). Hence, the output member 2 in its entirety is formed of a magnetic material.

The rotating input member shown generally at 4 includes a bushing 26 formed of a nearly cylindrical member. An annular anchoring ring 28 is fixed in the nearly central portion in the axial direction of the bushing 26 by a suitable method such as forcing with pressure. The portion of the bushing 26, which is more left than the anchoring ring 28 in FIG. 2, constitutes an input boss 30 positioned adjacent to the output boss 14 of the output member 2. An anchoring hole 32 extending radially is formed in the input boss 30. At the right end in FIG. 2 of the bushing 26, two arcuate protrusions 34 are formed which project axially at circumferentially spaced positions. The input member 4 includes a gear 36. An opening 38 is formed in the center of the gear 36. The opening 38 has two arcuate enlarged portions 40 coresponding to the arcuate protrusions 34. As clearly shown in FIG. 2, by causing the left end of the bushing 26, or the forward end of the input boss 30, to abut with the right end of the output boss 14, the bushing 26 is rotatably mounted on the shaft portion 12 of the output member 2. Conveniently, the outside diameter of the input boss 30 is made slightly larger than the outside diameter of the output boss 14 so that when as stated hereinbelow, the coil spring 8 is fitted astride the input boss 30 and the output boss 14, the coil spring 8 is fitted over the outside surface of the output boss 14 relatively weakly but the coil spring 8 is tightly fitted over the outside surface of the input boss 30. The gear 36 is mounted on the right end portion of the bushing 26. During this mounting operation, the two arcuate protrusions 34 of the bushing 26 are inserted in the two arcuate enlarged portions 40 of the opening 38 of the gear 36. Thus, the relative rotation of the bushing 26 and the gear 36 is hampered, and the bushing 26 and the gear 36 are rotated as a unit. After the shaft portion 12 of the output member 2 is mounted on the bushing 26 and the gear 36 is mounted on the bushing 26, the anchor ring 42 is fixed at the right end part of the shaft portion 12 by a suitable method such as forcing with a pressure, and therefore, the bushing 26 is prevented from coming out of the shaft portion 12, and the gear 36 from coming out of the bushing 26 (as will be described later, after the bushing 26 is mounted on the shaft portion 12 and before the gear 36 is mounted on the bushing 26, various constituent elements are mounted on the shaft portion 12 of the output member 2 and on the bushing 26). The bushing 26 of the input member 4 is formed of a suitable magnetic material such as an iron-type sintered material. On the other hand, the gear 36 may be formed of a non-magnetic material which may be a synthetic resin such as polyacetal.

The armature assembly shown generally at 6 is composed of an armature 44, a spring member 46 and a supporting member 48. The armature 44 is annular, and has three connecting holes 50 perforated therein in the axial direction and spaced circumferentially at equal intervals. On the inner circumferential edge of the armature 44, three nearly circular notches 52 positioned between the connecting holes 50 are formed. The armature 44 is formed of a magnetic material such as cold-rolled zinc plated steel (SECC). The spring member 46 is composed of a nearly annular plate spring, and has three connecting holes 54 perforated therein penetrating in the axial direction and spaced at equal intervals in the circumferential direction. In the inner circumferential edge of the spring member 46, three nearly circular projecting portions 56 are formed which project radially inwardly between the connecting holes 54. A connecting hole 58 axially perforated therein is also formed in each of the projecting portions 56. The spring member 46 may be formed of a material having proper spring properties such as spring steel. The supporting member 48 has an annular main portion 60 and a cylindrical protrusion 62 projecting from the inner circumferential circle of the main portion 60 and towards one side in the axial direction (the left side in FIG. 2). The main portion 60 has perforated therein three connecting holes 64 extending therethrough in the axial direction and spaced at equal intervals in the circumferential direction. In the outer circumferential edge of the main portion 60, three nearly circular notches 66 positioned between the connecting holes 64 are formed. Furthermore, the supporting member 48 has formed therein an engaging cut 68 extending radially from its inner circumferential edge to the proximity of the outer circumferential edge of the main portion 60. The supporting member 48 is formed of a non-magnetic material which may be a synthetic resin such as polyacetal. The armature 44 and the spring member 46 are connected to each other by inserting a rivet 69 (FIG. 4) through the connecting holes 50 of the armature 44 and the connecting holes 54 of the spring member 46 and fixing them by rivetting. The supporting member 48 and the spring member 46 can be connected to each other by inserting a rivet (not shown) through the connecting holes 64 of the supporting member 48 and the connecting holes 58 of the spring member 46 and fixing them by rivetting. Accordingly, the spring member 46 has a plurality of linking positions spaced from each other circumferentially, and is linked to the supporting member 48 at every other linking positions among these linking positions, and connected to the armature 44 at the remaining linking positions. Thus, the armature 44 and the supporting member 48 are connected to each other via the spring member 46. When the armature 44 and the supporting member 48 are connected, as is required, via the spring member 46, it is seen as clearly shown in FIG. 2 that the cylindrical protrusion 62 goes through the spring member 46 and the armature 44, and protrudes to the left in FIG. 2 beyond the armature 44. The head part of the rivet 69 (FIG. 4) connecting the armature 44 and the spring member 46 is positioned at the notch 66 formed in the outer circumferential edge of the main portion 60 of supporting member 48, and the head part of the rivet (not shown) connecting the supporting member 48 and the spring member 46 is positioned at the notch 52 formed in the inner circumferential edge of the armature 44. Accordingly, without being hampered by the head part of the rivets, the armature 44, the spring member 46 and the supporting member 48 are intimately contacted with one another in the axial direction as shown in FIG. 2. As shown in FIG. 2, the armature assembly 6 composed of the armature 44, the spring member 46 and the supporting member 48 is mounted on the output boss 14 formed in the shaft portion 12 in the output member 2. The forward end of the cylindrical protrusion 62 of the supporting member 48 which projects to the left beyond the armature 44 abuts against one surface of the rotor 18 in the output member 2. In this state, a gap results between the armature 44 and the rotor 18.

The coil spring 8 is formed by winding a spring wire material having a suitable sectional shape such as a rectangular shape helically so that it is wound in a direction in which it proceeds to the left as it is pivotted as seen clockwise from the right side in FIG. 2. The inside diameter of the coil spring 8 corresponds to the outside diameter of the output boss 14 of the output member 2 and the outside of the input boss 30 of the input member 4. An anchoring protruding piece 70 protruding radially inwardly is formed at the right end of the coil spring 8, and at the left end, an anchoring protruding piece 72 protruding radially outwardly is formed. This coil spring 8 may be formed from a spring wire material having proper spring characteristics such as spring steel wire. The coil spring 8, as shown clearly in FIG. 2, is fitted astride the output boss 14 of the output member 2 and the input boss 30 of the input member 4 positioned adjacent to the output boss 14. The anchoring protruding piece 70 of the coil spring 8 is inserted in the anchoring hole 32 formed in the bushing 26 of the input member 4, and thus, one end of the coil spring 8 is anchored at the input member 4. The other anchoring protruding piece 72 of the coil spring 8 is introduced into the engaging cut 68 formed in the supporting member 48 of the armature assembly 6, and thus, the other end of the coil spring 8 is anchored at the armature assembly 6.

Figure 3:
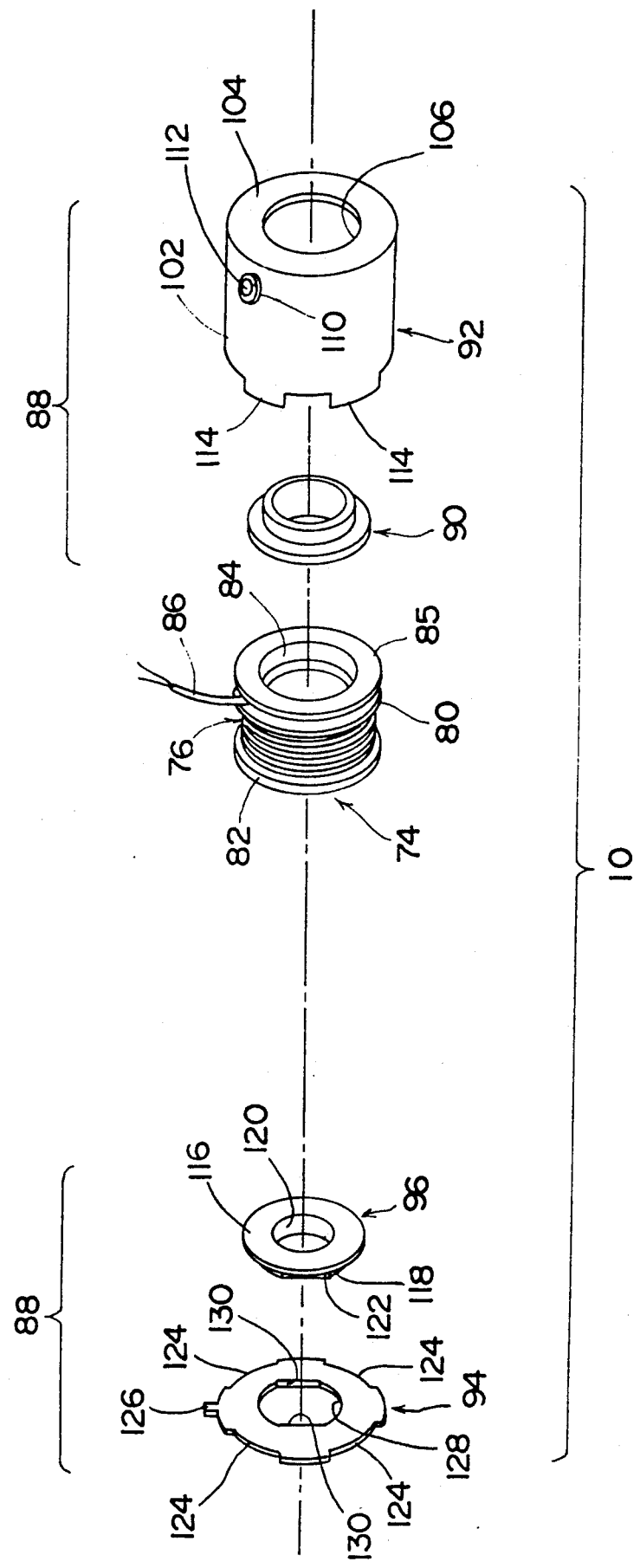
FIG. 3 is a partially exploded perspective view of the electromagnetic coil assembly of the electromagnetically controlled spring clutch mechanism of FIG. 1 as viewed from a direction opposite to FIG. 1.

Again with reference to FIGS. 1, 2 and 3, the electromagnetic coil assembly shown generally at 10 includes a bobbin 74 and an electromagnetic coil 76 accommodated in the bobbin 74. As clearly shown in FIG. 2, the bobbin 74 has a cylindrical inner circumferential wall 78 and annular side walls 80 and 82 disposed on both ends of the inner circumferential wall 78, and the outer circumferential surfaces between the side walls 80 and 82 are open. In the bobbin 74, a cylindrical additional wall 84 projecting axially outwardly from the outside surface of the one side wall 80 and an annular additional wall 85 extending radially outwardly from the forward end of the cylindrical additional wall 84 are also formed. The main portion of the electromagnetic coil 76 which is ring-shaped as a whole is held in a main accommodating space of the bobbin 74, namely a space defined by the inner circumferential wall 78 and both side walls 80 and 82. The connecting end portion 86 of the electromagnetic coil 76 passes through an opening (not shown) formed in the side wall 80, and is conducted to an additional space, i.e., the space defined by the one side wall 80 as well as the additional walls 84 and 85. The bobbin 74 is formed of a non-magnetic material such as polybutylene terephthalate, and its various walls function as magnetic shielding walls. The electromagnetic coil assembly 10 further includes a casing 88. The casing 88 is composed of a mounting sleeve 90, a casing body 92, an end plate 94 and a mounting plate 96. A stepped portion is formed in the outer circumferential surface of the mounting sleeve 90 which is cylindrical. In FIG. 2, the outside diameter of the right half portion 98 is relatively small, and the left half portion 100 in FIG. 2 has a relatively large diameter. The inside diameter of the mounting sleeve 90 corresponds to the outside diameter of the bushing 26 of the input member 4. The casing body 92 has a cylindrical wall 102 which is conveniently cylindrical with a relatively large diameter (but may be square-shaped cylindrical) and an end wall 104 which exists at the right end of the wall 102 in FIG. 2. A circular opening 106 is formed centrally in the end wall 104 of the casing body 92. The inside diameter of the circular opening 106 corresponds to the outside diameter of the right half portion 98. At the predetermined position of the cylindrical wall 102 of the casing main body 92, a hole 108 perforated radially is formed. In this hole 108, a guiding member 110 which may be made of a suitable synthetic resin is fitted. A lead-out hole 112 is formed in the guiding member 110, and the connecting end portion 86 of the electromagnetic coil 76 extends outside of the casing 88 by passing through the lead-out hole 112. In the forward end (left end in FIG. 2) of the cylindrical wall 102, four arcuate protrusions 114 projecting in the axial direction and spaced at equal intervals circumferentially are formed. The mounting plate 96 of the casing 88 is in the form of a circular plate. Its right half portion 116 in FIG. 2 has a relatively large outside diameter, and the outside diameter of the left half portion 118 is relatively small. A circular opening 120 is formed centrally in the mounting plate 96. The inside diameter of the opening 120 corresponds to the outside diameter of the left end poriton in FIG. 2 of the shaft portion 12 of the output member 2. The outer circumference of the left half portion 118 of a relatively small diameter of the mounting plate 96 is notched in an arcuate form at diametrically facing two sites to form two facing sites forming a linearly extending engaging portion 122. The end plate 94 of the casing 88 is nearly annular, and in its peripheral edge, four arcuate notches 124 spaced equidistantly circumferentially are formed. Such notches 124 are formed in correspondence to the arcuate protrusions 114 of the casing body 92. At the end plate 94, an engagement plate 136 extending radially outwardly is also formed. At the central part of the end plate 94, an opening 128 is formed. The opening 128 has a shape corresponding to the outside diameter of the left half portion 118 of the mounting plate 96, at diametrically facing two sites, anchoring portions 130 extending linearly are formed. The mounting sleeve 90 in the casing 88 is formed of a magnetic material such as an iron-type oil containing sintered material. The casing body 92 is formed of a magnetic material such as cold-rolled steel (SPCD). The end plate 94 in the casing 88 is formed of a magnetic material such as cold-rolled steel (SPCC). The mounting plate 96, on the other hand, is formed of a non-magnetic material such as polybutylene terephthalate.

As clearly shown in FIG. 2, the bobbin 74 in the electromagnetic coil assembly 10 and the electromagnetic coil 76 mounted thereon are accomodated in the casing body 92 of the casing 88. The connecting end portion 86 of the electromagnetic coil 76. The connecting end portion 86 of the electromagnetic coil 76 is led out externally through the lead-out hole 112 of the guiding member 110 mounted on the casing body 92. The mounting sleeve 90 of the casing 88 is fitted over the bushing 26 of the input member 4 relatively rotatably, and its left end comes near, or abuts with, the annular anchoring ring fixed to the bushing 26. The casing body 92 accommodating the bobbin 74 and the electromagnetic coil 76 mounted on it has its end wall 104 mounted on the right half portion 98 of the mounting sleeve 90. Its cylindrical wall 102 approximates the bobbin 74 and the outer circumferential surface of the electromagnetic coil 76 which is mounted on the bobbin 74 as well as the outer circumferential surface of the armature assembly 6 and the outer circumferential surface of the rotor 18, and extends to the left in FIG. 2 from the end wall 104. The bobbin 74 and the electromagnetic coil 76 mounted on it are positioned radially outwardly of the coil spring 8 adjacent to the armature assembly 6. Thus, the rotor 18 of the output member 2, the armature assembly 6 and the electromagnetic coil 76 are arranged successively in the axial direction in this order, and the electromagnetic coil 76 and the bobbin 74 on which it is mounted are dexterously accommodated in the space existing circumferentially of the coil spring 8. After the mounting sleeve 90 and the casing body 92 are mounted as are required, the gear 36 in the input member 4 is mounted on the bushing 26, and the gear 36 is caused to approximate and abut with the mounting sleeve 90 and the casing body 92. Thereafter, the above anchoring ring 42 is fixed to the right end portion of the bushing 26. Thus, the mounting sleeve 90 and the casing body 92 are maintained at a required position together with the bushing 26 and the gear 36. The mounting plate 96 for the casing 88, adjacent to the rotor 18 of the output member 2, are rotatably mounted on the left end portion of the shaft portion 12 relative to each other. The end plate 94 is mounted on the left half portion 118 of the mounting plate 96. At this time, the engaging portion 122 formed in the left half portion 118 of the mounting plate 96 is engaged with the engaging portion 130 formed in the opening 128 of the end plate 94, whereby the relative rotation of the mounting plate 96 and the end plate 94 is hampered. The arcuate protrusions 114 formed in the left end of the casing body 92 are projected into the arcuate notches 124 formed on the outer circumferential surface of the end plate 94 mounted on the mounting plate 96. By a suitable manner such as caulking, the arcuate protrusions 114 and the arcurate notches 124 are fixed to each other, and thus, the end plate 94 is fixed to the casing body 92. When the electromagnetically controlled spring clutch mechanism is assembled as required in the above manner, it is understood clearly from FIG. 2 that the casing 88 covers not only the bobbin 74 and the electromagnetic coil 76 mounted on it but also the rotor 18, the armature assembly 6 and the coil spring 8. And the rotor 18, the armature assembly 6, the coil spring 8, the bobbin 74 and the electromagnetic coil 76 mounted on it are accommodated in a space surrounded by the casing 88 and the shaft portion 12 of the output member 2, and the input member 4. Accordingly, the rotor 18, the armature assembly 6, the coil spring 8, and the electromagnetic coil 76 are fully accurately prevented from collecting dust, and the deterioration of the performance of the magnetic clutch owing to dust collection is surely avoided.

The manner of using the electromagnetically controlled spring clutch mechanism will be described. As shown by the two-dot chain line in FIG. 2, a rotating shaft 132 of which rotation is to be controlled is inserted through the shaft portion 12 of the output member 2. Then, a setscrew 134 is applied to the screw hole 22 of the shaft portion 12 to fix the rotating shaft 132 and the shaft portion 12 of the output member 2. The gear 36 of the input member 4 is drivingly connected to a drive source which may be a motor via a suitable drivingly connecting means (not shown) such as a series of gears. The engagement piece 126 formed in the end plate 94 of the casing 88 is anchored at a suitable site, whereby the rotation of the casing 88 and of the bobbin 74 and the electromagnetic coil 76 accommodated in it are hampered. When the above drive source (not shown) to which the gear 36 of the input member 4 is drivingly connected is energized, the input member 4 including the gear 36 is rotated clockwise as seen from the right side in FIG. 2. This rotation of the input member 4 is transmitted to the armature assembly 6 via the coil spring 8, and therefore, the armature assembly 6 is also rotated clockwise as seen from the right side in FIG. 2. On the other hand, when the electromagnetic coil 76 is deenergized, it is clearly shown in FIG. 4 that the armature 44 of the armature assembly 6 is isolated from the rotor 18 of the output member 2, and the output member 2 including the rotor 18 is maintained stationary without rotation.

Figure 4:
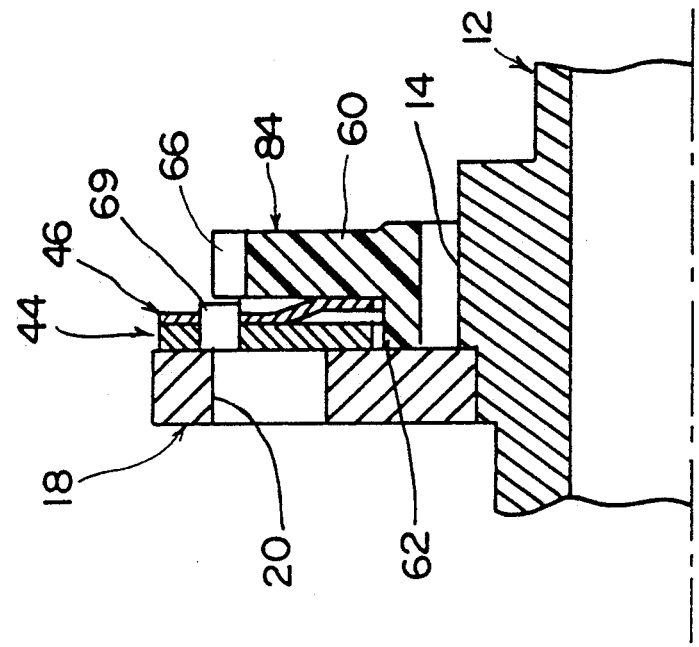
FIG. 4 is a partially enlarged sectional view showing a part of the electromagnetically controlled spring clutch mechanism in a state where the electromagnetic coil is deenergized.
Figure 5:
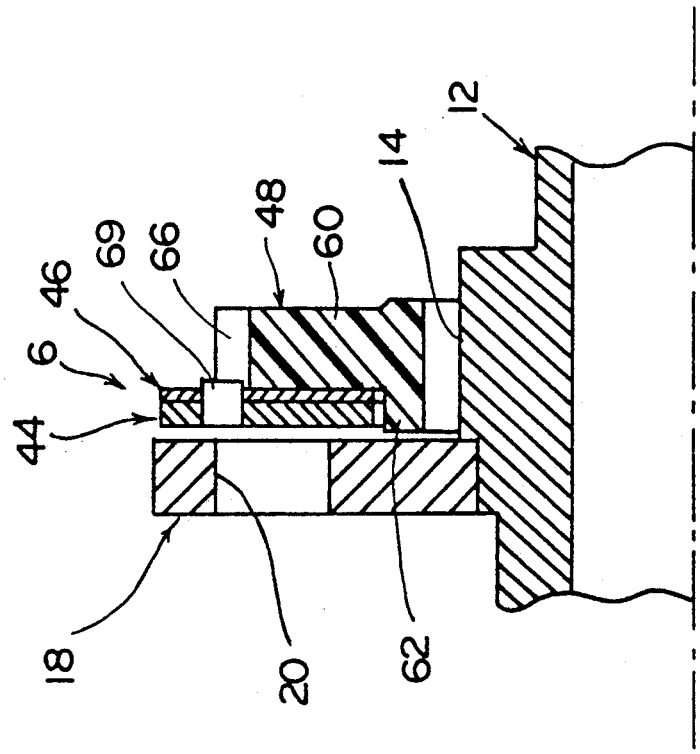
FIG. 5 is a partially enlarged sectional view showing a part of the electromagnetically controlled spring clutch mechanism in a state where the electromagnetic coil is energized.

When the electromagnetic coil 76 is energized, a magnetic field passing through magnetic paths shown by broken lines in FIG. 2 is created. This is because the entirety of the output member 2, the bushing 26 of the input member 4, the mounting sleeve 90 of the casing 88, the casing body 92, and the armature 44 of the armature assembly 6 are made of magnetic materials, and these elements are sufficiently proximate to one another. By the magnetic attracting force produced between the rotor 18 of the output member 2 and the armature 44, the spring member 46 in the armature assembly 6 is elastically deformed to move the armature 44 toward the rotor 18, and the armature 44 is attracted to the rotor 18, as shown in FIG. 5. Since the gap between the rotor 18 and the armature 44 can be made sufficiently small, by utilizing effectively the magnetic attracting force generated by the energization of the electromagnetic coil 76, the armature 44 can be attracted magnetically to the rotor 18 very rapidly. When the armature 44 is magnetically attracted to the rotor 18, the output member 2 is connected to the armature assembly 6, and the rotation of the armature assembly 6, and therefore the rotation of the coil spring 8 anchored at one end at the supporting member 48 of the armature assembly 6, is hampered. Then, the rotating force exerted on the coil spring 8 from the input member 4 at which the other end of the coil spring 8 is anchored, contracts the coil spring 8, whereby the coil spring 8 is tightly wound on the input boss 30 of the input member 4 and the output boss 14 of the output member 2, and the input boss 30 is linked to the output member 2. Thus, the input member 4 is connected to the output member 2, and the input member 4, the coil spring 8, the armature assembly 6 and the output member 2 are rotated clockwise, as a unit, as seen from the right side in FIG. 2. When the electromagnetic coil 76 is deenergized, the armature 44 is returned to the original position and isolated from the rotor 18 by the elastic recovery of the spring member 46 in the armature assembly 6, as shown in FIG. 4. As a result, the coil spring 8 and the armature assembly 6 are rotated together with the input member 4, but no rotating force is transmitted to the output member 2.

While the present invention has been described in detail hereinabove with reference to the accompanying drawings with regard to preferred embodiments of the electromagnetically controlled spring clutch mechanism, it should be understood that the invention is not to be limited to these specific embodiments, and various changes and modifications are possible without departing from the scope of claims claimed herein.

Since in the electromagnetically controlled spring clutch mechanism constructed in accordance with this invention, the rotor, the armature assembly and the electromagnetic coil are successively arranged in this sequence in the axial direction, the electromagnetic coil can be accommodated by dexterously utilizing the space existing in the outer circumference of the coil spring. Accordingly, a drastic reduction in size can be realized. On the other hand, when the electromagnetic coil is energized, a magnetic field is created passing through magnetic paths which pass through the rotor and armature. By this magnetic field, the armature is magnetically attracted to the rotor and the rotor and the armature to be attracted can be disposed fully approximately to each other. Accordingly, the armature can be attracted to the rotor fully rapidly with regard to the magnetic attracting ability of the electromagnetic coil, and at the time of linking, a reduction in response speed does not arise.

In the electromagnetically controlled spring clutch mechanism constructed in accordance with the present invention, not only the electromagnetic coil but also the rotor of the output member, the armature assembly and the coil spring are covered by the casing for the electromagnetic coil assembly. Accordingly, these constituent elements are accurately prevented from collecting dust, and deterioration in performance owing to the adhesion of dust can be surely avoided.

What we claim is:

1. An electromagnetically controlled spring clutch mechanism comprising a rotating output member having an output boss and a rotor, a rotating input member having an input boss adjacent to the output boss, an armature assembly including a supporting member and an armature linked to each other via a spring member, an electromagnetic coil assembly including an electromagnetic coil, and a coil spring fitted astride the output boss and the input boss, one end of the coil spring being anchored at the input member and its other end at the armature assembly, said spring clutch mechanism being of such a type that when the electromagnetic coil is energized, the armature is magnetically attracted, and the spring member is elastically deformed and the armature is attracted to the rotor, and by the contraction of the coil spring, the input boss and the output boss are drivingly coupled with each other, and when the electromagnetic coil is deenergized, the spring member elastically recovers, and the armature is isolated from the rotor;

wherein the rotor, the armature assembly and the electromagnetic coil assembly are successively arranged in this sequence in an axial direction, the armature is positioned adjacent to the rotor, the electromagnetic coil is positioned radially outwardly of the coil spring, the electromagnetic coil assembly includes a casing as well as a shielding wall of non-magnetic material positioned between the electromagnetic coil and the armature assembly, the casing has a cylindrical wall of a magnetic material extending in proximity to an outside circumferential surface of the electromagnetic coil and to an outside circumferential surface of the rotor, at least a portion of the output member including the rotor and at least a portion of the input member are made of a magnetic material, and when the electromagnetic coil is energized, the presence of a magnetic path passing through the casing, at least a portion of the output member including the rotor, and at least a portion of the input member causes the armature to be magnetically attracted to the rotor.

2. The electromagnetically controlled spring clutch mechanism of claim 1 wherein said casing is composed of a main body made of a magnetic material having the cylindrical wall and an end wall at one end of the cylindrical wall, and an end wall member mounted on another end of the cylindrical wall, and the rotor, the armature assembly, the electromagnetic coil and the coil spring are covered by the casing.

3. The electromagnetically controlled spring clutch mechanism of claim 1 wherein the output member has a shaft portion extending in an axial direction, the output boss and the rotor are disposed on the shaft portion, the input member is rotatably fitted over the shaft portion of the output member, and the rotor, the armature assembly, the electromagnetic coil and the coil spring are accommodated within a space surrounded by the casing, the shaft portion of the output member and the input member.

4. The electromagnetically controlled spring clutch mechanism of claim 1 wherein the electromagnetic coil assembly has a bobbin made of a non-magnetic material, said bobbin having an inner circumferential wall, and two side walls at both ends of the inner circumferential wall, the bobbin having an open outer circumferential surface, the electromagnetic coil is accommodated in a space defined by the inner circumferential wall and both side walls, and one of the two side walls of the bobbin constitutes the shielding wall.

5. The electromagnetically controlled spring clutch mechanism of claim 1 wherein the spring member of the armature assembly is composed of a nearly annular plate spring linked to the supporting member at every other linking position in a plurality of linking positions spaced from each other circumferentially and to the armature at the remaining linking positions.

6. An electromagnetically controlled spring clutch mechanism comprising a rotating output member having an output boss and a rotor, a rotating input member having an input boss adjacent to the output boss, an armature assembly including a supporting member and an armature linked to each other via a spring member, an electromagnetic coil assembly including an electromagnetic coil, and a coil spring fitted astride the output boss and the input boss, one end of the coil spring being anchored at the input member and its other end at the armature assembly, said spring clutch mechanism being of such a type that when the electromagnetic coil is energized, the armature is magnetically attracted, and the spring member is elastically deformed and the armature is attracted to the rotor, and by the contraction of the coil spring, the input boss and the output boss are drivingly coupled with each other, and when the electromagnetic coil is deenergized, the spring member elastically recovers, and the armature is isolated from the rotor;

wherein the electromagnetic coil assembly includes a casing having a cylindrical wall having ends and two end walls at the ends of the cylindrical wall, and the rotor, the armature assembly, the electromagnetic coil and the coil spring are covered by the casing.

7. The electromagnetically controlled spring clutch mechanism of claim 6 wherein the casing is composed of a main body forming the cylindrical wall and one end wall and an end wall member mounted on the main body and forming the other end wall of the casing.

8. The electromagnetically controlled spring clutch mechanism of claim 7 wherein the output member has a shaft portion extending in an axial direction, the output boss and the rotor are disposed on the shaft portion, the input member is fitted rotatably over the shaft portion, and the rotor, the armature assembly, the electromagnetic coil and the coil spring are accommodated in a space surrounded by the casing, the shaft portion of the output member and the input member.

9. The electromagnetically controlled clutch mechanism of claim 6 wherein the spring member of the armature assembly is composed of a nearly annular plate spring linked to the supporting member at every other linking position in a plurality of linking positions spaced from each other circumferentially and to the armature at the remaining linking positions.

* * * * *